US006940835B2

(12) United States Patent
Reza et al.

(10) Patent No.: US 6,940,835 B2
(45) Date of Patent: Sep. 6, 2005

(54) APPLICATION-LEVEL MOBILITY SUPPORT IN COMMUNICATIONS NETWORK

(75) Inventors: Ahmed Areef Reza, Ottawa (CA); Hongyi Li, Kanata (CA)

(73) Assignee: Nortel Networks Limited, St. Laurent (CA)

( * ) Notice: Subject to any disclaimer, the term of this patent is extended or adjusted under 35 U.S.C. 154(b) by 834 days.

(21) Appl. No.: 09/749,455

(22) Filed: Dec. 28, 2000

(65) Prior Publication Data

US 2002/0085549 A1 Jul. 4, 2002

(51) Int. Cl.[7] .................... H04Q 7/00; H04L 12/28
(52) U.S. Cl. .............. 370/331; 370/389; 370/401; 455/436
(58) Field of Search ................ 370/252, 328, 370/329, 330, 331, 352, 389, 401; 709/227, 228, 238; 455/436

(56) References Cited

U.S. PATENT DOCUMENTS

| | | | |
|---|---|---|---|
| 5,159,592 A | * 10/1992 | Perkins | 370/338 |
| 6,130,892 A | * 10/2000 | Short et al. | 370/401 |
| 6,230,012 B1 | * 5/2001 | Willkie et al. | 455/435.1 |
| 6,587,882 B1 | * 7/2003 | Inoue et al. | 709/227 |
| 6,651,105 B1 | * 11/2003 | Bhagwat et al. | 709/239 |
| 6,654,607 B1 | * 11/2003 | Shobatake et al. | 455/433 |
| 6,691,227 B1 | * 2/2004 | Neves et al. | 713/162 |
| 6,839,759 B2 | * 1/2005 | Larson et al. | 709/228 |
| 2001/0046223 A1 | * 11/2001 | Malki et al. | 370/338 |
| 2002/0026527 A1 | * 2/2002 | Das et al. | 709/245 |

OTHER PUBLICATIONS

Ajay Bakre and B.R. Badrinath; M–RPC: A Remote Procedure Call Service for Mobile Clients; pp. 1–13.
Ajay Bakre and B.R. Badrinath; I–TCP: Indirect TCP for Mobile Hosts; Oct. 1994; pp. 1–18.
J. Viezades, E. Guttman, C. Perkins, Sun Microsystems; S. Kaplin; Network Working Group; Standards Track; Service Location Protocol; Jun. 1997; pp. 1–60.
M. Handley, ACIRI; H. Schulzrinne, Columbia U.; E. Schooler, Cal Tech; J. Rosenberg, Bell Labs; SIP: Network Working Group; Standards Track; Session Initiation Protocol; Mar. 1999; pp. 1–126.

* cited by examiner

Primary Examiner—Hassan Kizou
Assistant Examiner—Gregory Sefcheck

(57) ABSTRACT

A method and apparatus for bi-directional transfer of information between a corresponding host and a mobile host in a communications network where each user is assigned a unique network address. In accordance with the teaching of the invention, mobility M- and N-proxies are provided for intercepting data incoming from the mobile host and redirecting it to the corresponding host via transitional transmission sessions established by the proxies, such that the migration of the mobile host from one coverage area to another is transparent to the network application running on the mobile host.

18 Claims, 7 Drawing Sheets

APPLICATION-LEVEL MOBILITY SUPPORT IN COMMUNICATIONS NETWORK

FIELD OF THE INVENTION

The present invention relates generally to communications systems, and more particularly, to a method and apparatus to support mobility in a data communications network.

BACKGROUND OF THE INVENTION

With the ever-increasing popularity of mobile computing, mobile communications is quickly becoming the platform of choice for implementation of network hosts of the future. The trend for convergence between mobile computing and conventional communications networks allows mobile users to enjoy ubiquitous access to network resources irrespective of their current locations. However, the integration of mobile hosts into the existing networks consisting of fixed hosts causes particular problems arising from the specific connectivity requirements of mobile users.

Conventionally, most network application programs employ the Transport Control Protocol/Internet Protocol (TCP/IP) for end-to-end delivery of information amongst various network subscribers. TCP/IP provides each host with a unique communications protocol address (commonly referred to as IP address) which serves to resolve the location and identity of the host. The IP address enables an application running on a host to set up and maintain dialogue with another host on the network.

When at home, a mobile host uses its IP address to communicate with other hosts. However, when away from home, the IP address of the mobile host changes, and the active transmission session between the mobile host and the network may become temporarily lost or disconnected due to the migration of the mobile host from one coverage area to another (handoff). As a result of such breaks in the transmission session, the mobile host is unable to continue corresponding with other hosts in the network.

In recent years, several solutions such as Cellular IP, HAWAII, MIPv4 and MIPv6 have been proposed to provide mobility support in a communications network. These solutions, however, often require mobility support from the underlying network.

Another proposed solution referred to as Indirect-TCP seeks to separate data flow by splitting the transmission session into two separate connections: a first TCP connection between the mobile host and the point of attachment to the network (for example a radio access station), and a second connection between the point of attachment and the corresponding host. By using a link-specific protocol optimized for mobile communications, I-TCP improves the overall performance during handoff. However, I-TCP cannot be readily implemented on existing network platforms as it requires fundamental changes to the TCP/IP protocol.

Accordingly, an important challenge for supporting mobility in TCP/IP resides in handling the IP address changes when a mobile host moves from coverage area to another. In view of the shortcomings of the current networks, there is therefore a need for a technique for reliable routing of data to mobile hosts in a communications network. Preferably, such system would be deal with mobility issues at the application level and may be implemented as an extension of the current network infrastructures, thereby least affecting the architecture of conventional network systems.

SUMMARY OF THE INVENTION

The foregoing shortcomings and other similar problems of the state-of-the-art networks are overcome by providing a novel system to dynamically support mobility between a mobile host and a corresponding host in a network, such that any change from one geographical location to another is completely transparent to either the mobile or the corresponding host.

This invention arises from the realization that end-to-end communications in networks having mobile users suffer from significant losses due to lost connections caused by changes in the communications protocol address during handoff. These problems are obviated by providing a reliable transmission session between the endpoints whereby data destined to the corresponding host is first transmitted through a mobility M-proxy having a capture layer to intercept the data in flight, and subsequently diverting the data to a mobility N-proxy en route to the corresponding host, while preserving the end-to-end routing principles of TCP/IP. As the mobile host migrates from one geographical location to another, the M-proxy detects a lost connection with the N-proxy and reestablishes a new TCP connection with the N-proxy, such that the entire handoff procedure becomes transparent to the mobile user.

The invention features a novel method and apparatus for data packet transmission between a plurality of hosts in a communications network wherein each host has a unique network IP address. The hosts communicate with each other through an access network having at least a gateway providing an external point of attachment to an Internet backbone network. The access network also includes a plurality of edge routers, each having a predetermined coverage area associated therewith to service mobility to the mobile hosts. In an attempt to provide reliable data stream to a mobile host, there is also provided a mobility M-proxy having a capture layer for intercepting and terminating within itself the flow of a data from the mobile host to a corresponding host. The M-proxy achieves this by changing the addressing information of the data such that the data appears to have originated from the M-proxy instead of the mobile host. Additionally, a transmission session is set up by the M-proxy with a mobility agent N-proxy responsible for delivering the data from the M-proxy to the corresponding host. The M-proxy is configured to maintain and reestablish its transmission session with the N-proxy when the mobile host migrates from one coverage area to another.

Other aspects and features of the present invention will become apparent to those ordinarily skilled in the art upon review of the following description of specific embodiments of the invention in conjunction with the accompanying figures.

DETAILED DESCRIPTION OF THE PREFERRED EMBODIMENTS

Figure 1:
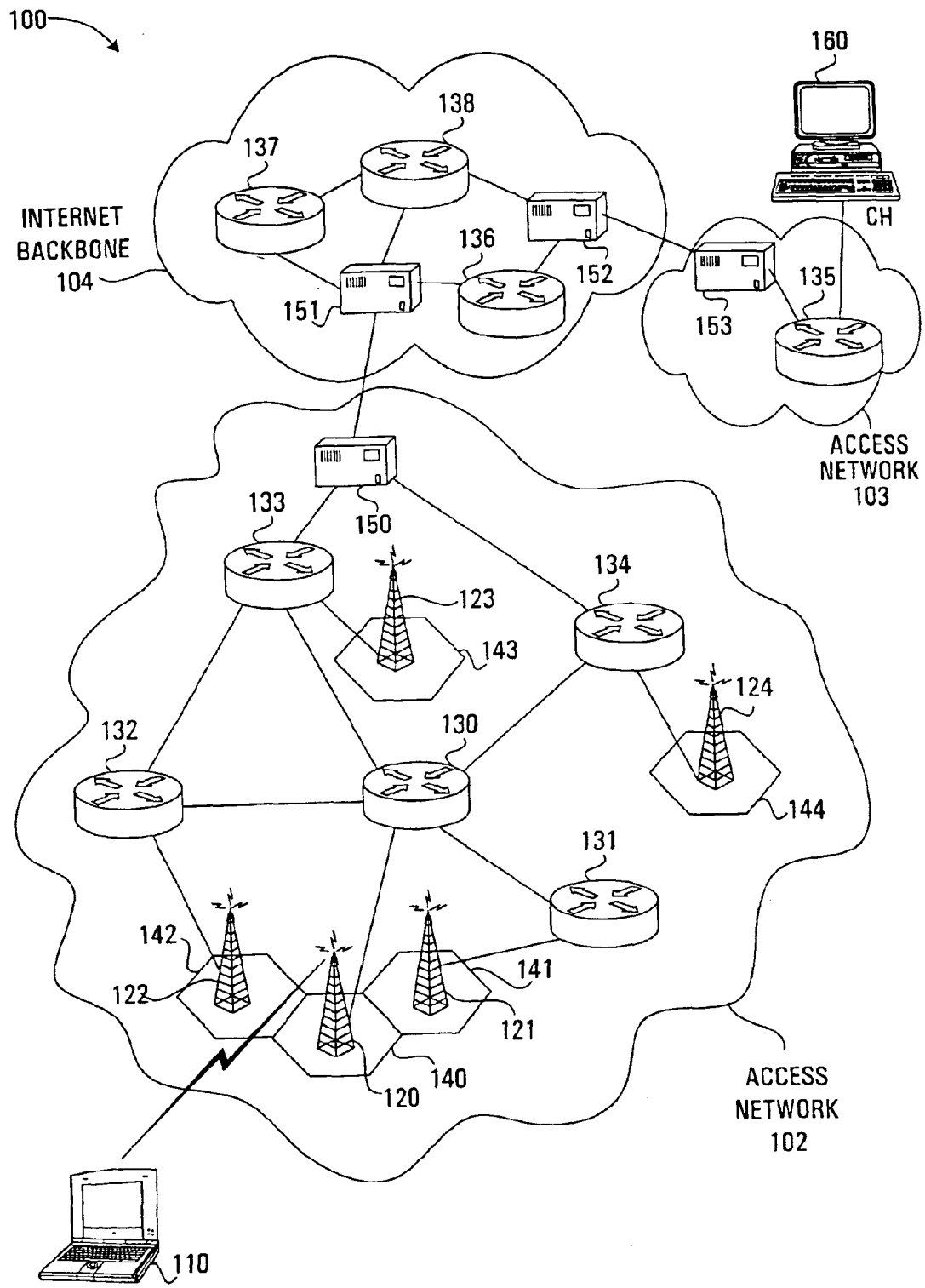
FIG. 1 is a schematic diagram of a communications network adaptable to the current invention.

A preferred embodiment of the present invention is hereafter described with reference to FIGS. 1 to 6. FIG. 1 shows a state-of-the-art communications network 100 that can be adapted to the current invention. The network 100 typically includes access networks 102, 103, and an Internet backbone network 104. The access networks 102, 103, together with the Internet backbone 104, form a skeleton for communicating data between various users of the network 100.

The access network 102 serves as an access point for providing mobile communications service to various mobile network subscribers. The access network 102 includes a plurality of radio access stations (RAS) five of which 120, 121, 122, 123 and 124 are shown. These RASes 120, 121, 122, 123, and 124 are bi-directionally coupled to access network 102 by means of edge routers (ERs) 130, 131, 132, 133, and 134 respectively. Each RAS 120, 121, 122, 123 and 124 acts as a point of attachment to the access network 102, providing wireless services and resources to at least a mobile host (MH) 110 within a radio coverage area (RCA) 140, 141, 142, 143, and 144 associated with a particular RAS. Typically, the MH 110 (for example a laptop computer, cellular telephone, or personal digital assistant) is served by a single RAS 120 and maintains quiescent wireless connection with the access network 102 by means of the RAS's 120 corresponding ER 130. The access network 102 further includes a gateway 150 connected to ERs 133 and 134 to provide data transfer to other networks. The access network 102 may also include a plurality of routers (not shown) to transfer data amongst various network subscribers.

The access network 103 includes an ER 135 to provide network service and resources to a corresponding host (typically a server, a laptop, a personal computer, or a mobile host) (CH) 160. The access network 103 further includes a gateway 153 connected to the ER 135 to communicate with systems on other networks.

The Internet backbone 104 includes various interconnected routers 136, 137, and 138, and gateways 151 and 152. Gateway 151 may be connected to gateway 150 to connect the access network 102 to the Internet backbone 104. In a similar fashion, gateway 152 maybe connected to gateway 153 to connect the access network 103 to the Internet backbone 104. In this way, end-to-end transfer of data amongst various users of this web of interconnected networks is possible as presented.

Network 100 employs, in the presently preferred embodiment of the invention, the popular Transport Control Protocol/Internet Protocol (TCP/IP). In accordance with the TCP/IP protocol, network 100 is configured such that each MH 110 is assigned a unique network IP address. The IP address typically consists of 32 bits and is often expressed in decimal dotted notation and is generally divided into a host identification portion relating to the device itself and a network identification portion corresponding to the RCA 140 wherein the MH 110 currently resides. It is assumed for the purposes of the ensuing description that the MH 110 acquires a new IP address as it migrates from one RCA 120 to another RCA 121.

Figure 2:
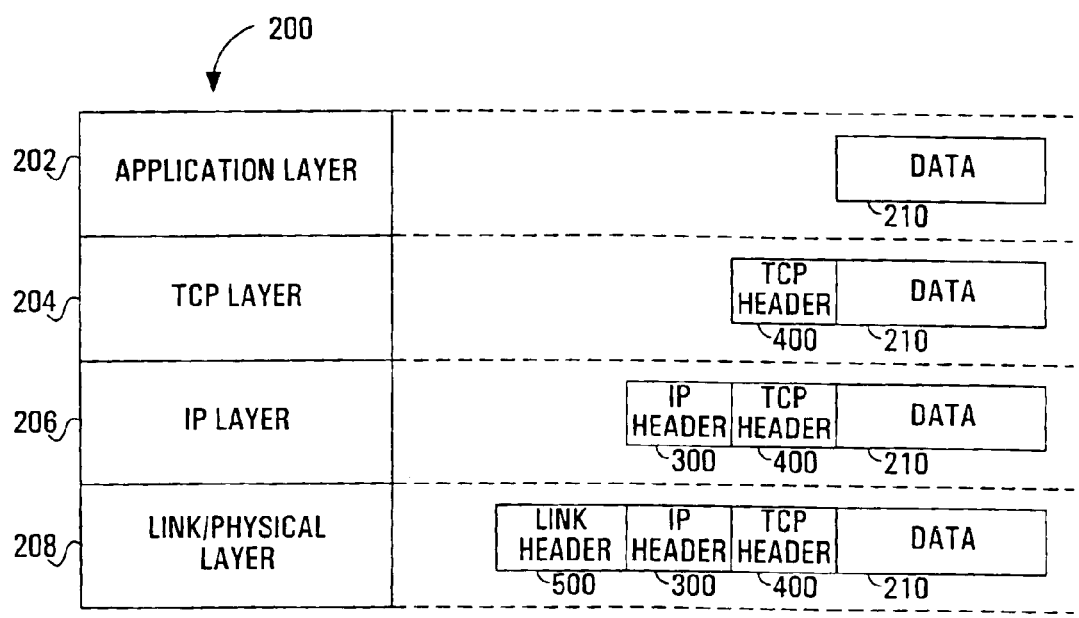
FIG. 2 is a graphical representation of the TCP/IP protocol stack.

Referring now to FIG. 2, there is shown a TCP/IP protocol stack 200 having various protocol layers 202, 204, 206, and 208 corresponding to the TCP/IP architecture. Each protocol layer defines a specific function performed as data 210 is transferred between collaborating network applications.

A data 210 to be transmitted from a sending process on the MH 110 is generally passed down through the protocol stack 200 for transmission to the receiving process on the CH 160. As the data 210 works its way down through the protocol stack 200, each protocol layer 202, 204, 206, and 208 adds a header and possibly also a trailer to the data unit in order to convey the information used by the particular protocol layer. The TCP layer 204 adds a TCP header 400 to the data 210. The IP layer 206 adds an IP header 300 above the TCP header 400. The link/physical layer 208 adds a network header 500 on top of the IP header 300. As a result, the data 210 is encapsulated by various protocol layers as it moves down the protocol stack 200. For the purposes of the ensuing description, an encapsulated data 210 at any level of the protocol stack 200 is globally referred to as a data packet.

Figure 2A:
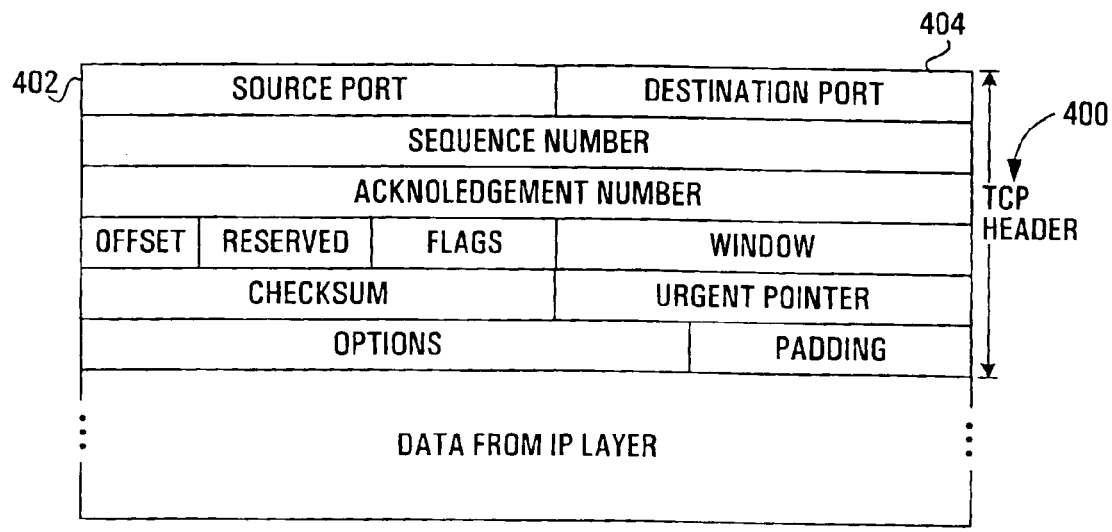
FIG. 2A is a graphical representation of a TCP header.

The application layer 202 is the user-end interface where applications such as electronic mail, TELNET, or Internet web browsing reside. The application layer 202 is mainly responsible for displaying incoming information or forwarding outgoing data 210 to subsequent layers. At the heart of the TCP/IP protocol, the TCP layer 204 is responsible for providing reliable data packet delivery services with end-to-end error detection and correction to application programs. As illustrated in FIG. 2A, the TCP header 400 is provided, amongst other fields, with a source port 402 and a destination port 404. The source port 402 corresponds to the port number of the sending application, and the destination port is the port number of the receiving application.

Figure 2B:
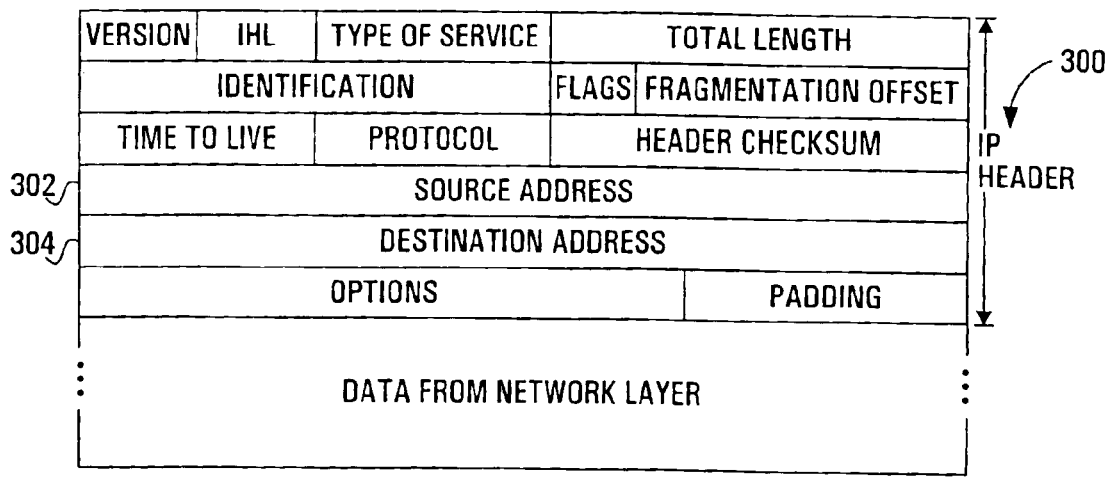
FIG. 2B is a graphical representation of an IP header.

Referring back to FIG. 2, the IP layer 206 is located below the TCP layer 204. The IP layer 206 provides the basic data delivery services across multiple networks. FIG. 2B shows the IP header 300. To ensure effective delivery, each IP header 300 is provided, amongst other things, with a source address 302 and destination address 304 contained in the IP layer header 300. The source and destination addresses 302, 304 identify the sending and receiving hosts respectively.

The IP layer independently routes each data 210 to its destination in accordance with the destination address. Routing is typically done using a lookup table residing in each router 130, 131, 132, 133, 134, 135, 136, 137, and 138, or gateways 150, 151, 152 and 153 generally based on the source and destination addresses 302 and 304 of FIG. 2B. As for the link/physical layer 208, it consists mainly of routines for accessing the various hardware components of the network 100.

Figure 3:
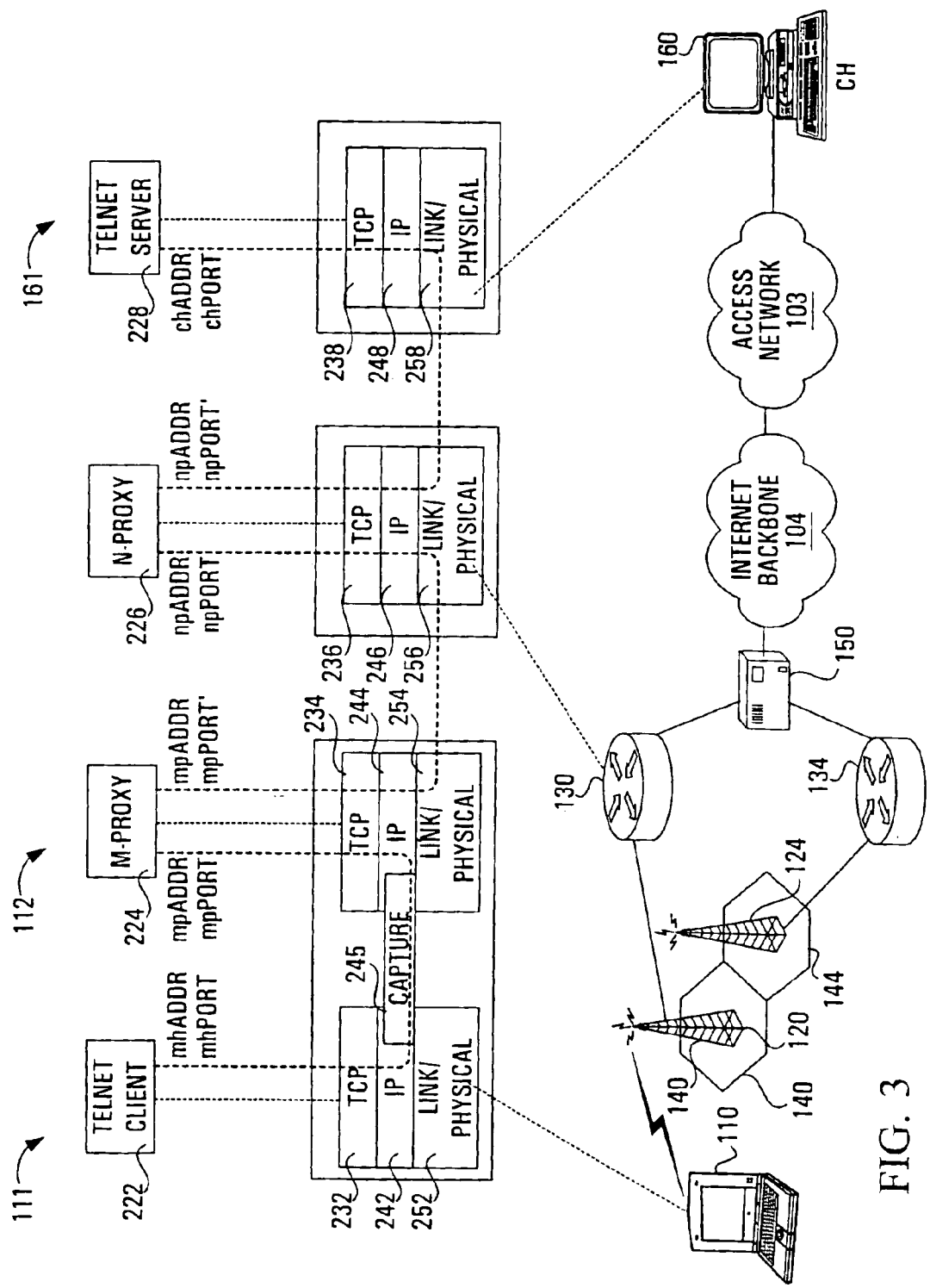
FIG. 3 is logical representation of an illustrative embodiment of a network topology built in accordance with the teaching of the current invention.
Figure 4:
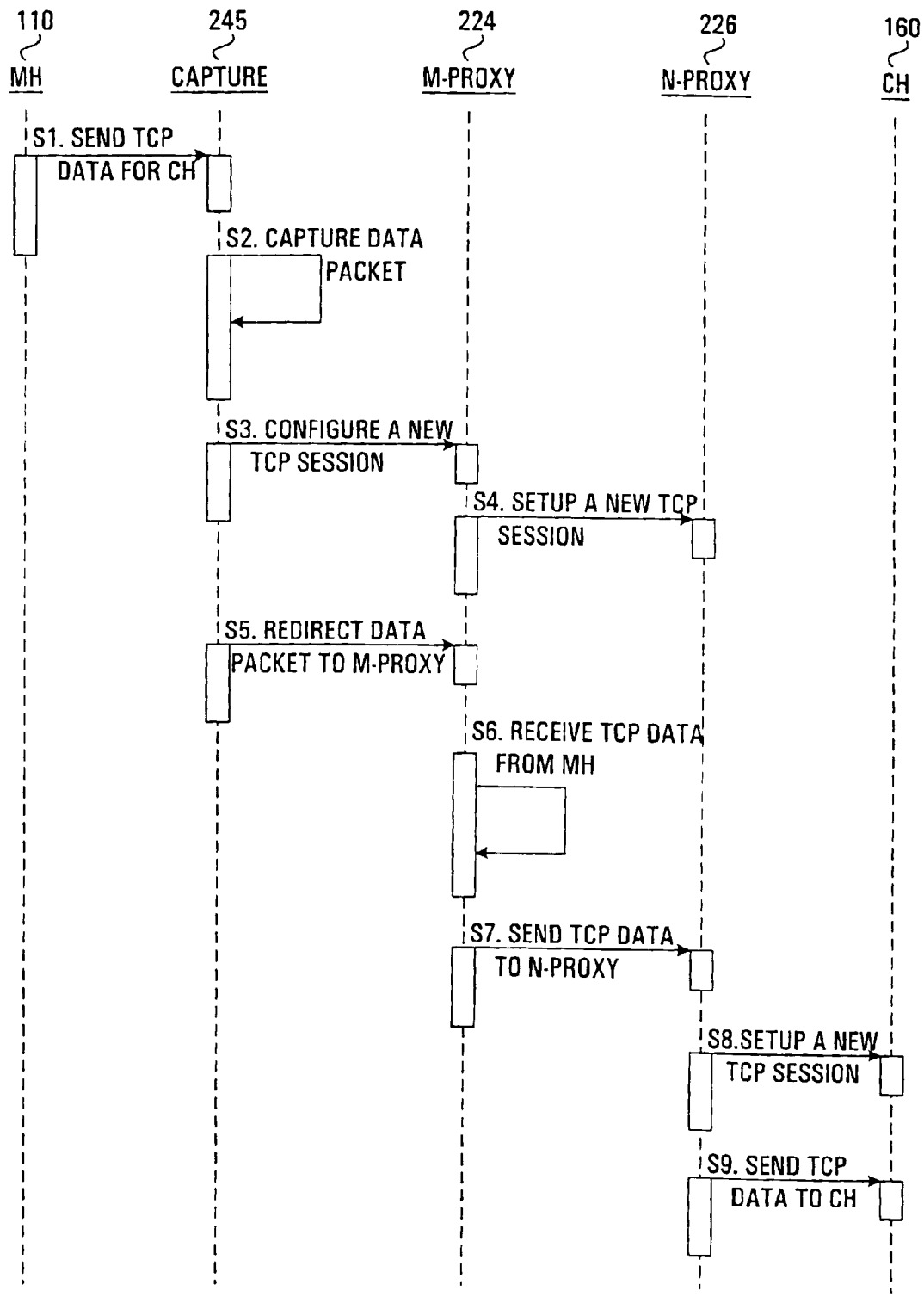
FIG. 4 is an exemplary sequence diagram showing the chain of steps undertaken by the mobile host in order to set up a new transmission session and communicate data with the corresponding host.
Figure 5:
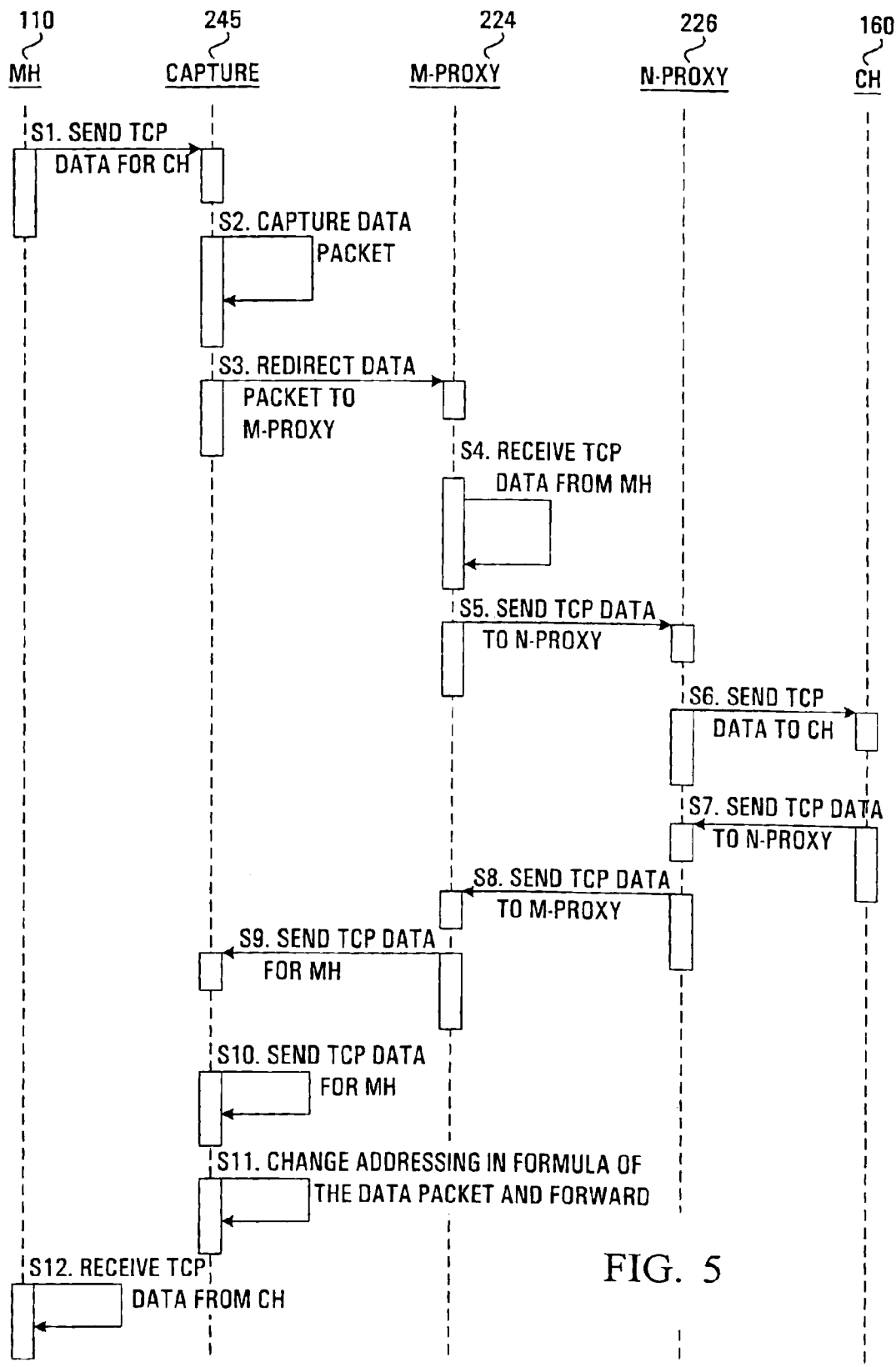
FIG. 5 is an exemplary sequence diagram depicting the chain of steps involved in the mobile host continuing to exchange TCP data with the corresponding host.

FIG. 3 describes a preferred embodiment of the current invention based on the communications network 100 of FIG. 1. For ease of comparison, corresponding devices are denoted by the same numerals as FIG. 1. The mobile host 110 includes a MH protocol stack 111 comprising various TCP/IP layers, namely an application layer 222 running a network application such as Telnet, a TCP layer 232, an IP layer 242, and a link/physical layer 252. These layers are required, by design, to handle data communications between the MH 110 and the CH 160 based on the TCP/IP architecture. Similarly, the CH 160 includes a CH protocol stack 161 comprising TCP/IP layers 228, 238, 248, and 258 to exchange data with various network subscribers, for example the MH 110.

Since the MH 110 is inherently nomadic and does not maintain a fixed connection with the network 100, a problem arises when the MH 110 migrates or moves from an RCA 140 to another RCA 144 serviced by a different RAS 124. In accordance with the addressing principles of the TCP/IP protocol, the MH 110 acquires a new IP address as it travels from one RCA to another. This change of identity is problematic since an application running at the CH 160 cannot reestablish dialogue with the MH 110 through the ER 134. As the MH 110 navigates between different RCAs, the route taken by the data packet between the MH 110 and the CH 160 must be updated. Otherwise, a data packet traversing the network 100 during handoff may become lost or discarded by the server application due to loss of connectivity.

The problem of loss of connectivity is solved, as described below, by providing a handoff mechanism involving mobility proxies, such that the entire handoff is transparent to the application running on the MH 110. A mobility proxy is generally a software entity running on an endpoint or a network node in order to provide terminal mobility. Typically, a mobility proxy communicates with a peer mobility proxy to handle mobility-related issues for a mobile host. To efficiently support mobility in the network 100, a mobility M-proxy 224 and a mobility N-proxy 226 are introduced in accordance with the teaching of the invention. The M- and N-proxies 224, 226 are applications running in the application layer 222 on top of the TCP layer 232. The M-proxy 224 is typically a network application being executed on the MH 110, and generally includes a set of instructions to intercept data sent by an application in the MH 110 to the CH 160. To achieve this, the M-proxy 224 utilizes a capture layer 245 introduced below the IP layer 242 of the MH protocol stack 111. Advantageously, the M-proxy 224 and the capture layer 245 are co-located with the MH 110 itself. As a result, the MH 110 contains two separate protocol stacks 111 and 112, hence two distinct IP addresses.

The M-proxy 224 is responsible for handling the IP address obtained from the access network 102. This IP address may change as the MH 110 navigates between various RCAs. All applications running on the MH 110 use a unique home IP address that never changes even if the MH 110 moves. This local IP address is transparent to all other hosts on the network 100.

The N-proxy 226, on the other hand, is generally a network application acting in peer relationship with the M-proxy 224. The N-proxy 226 is in bi-directional communications with the M-proxy 224 and the CH 160 and is responsible for transmitting information received from M-proxy 224 to CH 160 and back. The N-proxy 226 is preferably co-located with the ER 130 of the access network 102. Alternatively, the N-proxy 226 may be located inside the MH 110 as well CH 160, or at any other application node providing application service to the MH 110 through the access network 102.

To establish a transmission session with the N-proxy 226, the M-proxy 224 needs to discover the N-proxy 226 in the network 100. Once the MH 110 attaches to the access network 102, the M-proxy 224 can discover the N-proxy 226 by a service discovery protocol such as the "Service Location Protocol" as described in RFC 2165 produced by the Internet Engineering Task Force (IETF) and incorporated herein by reference.

An interesting feature of the current invention is that the M- and N-proxies 224, 226 operate asynchronously and independent of the network application. This means that the CH 160 does not have to wait for any acknowledgement from the MH 110. An important advantage of using the M-proxy 224 and N-proxy 226 is that as the M-proxy 224 is free to follow the migrating MH 110, mobility support and service resources are not tied up to the underlying access network 102. Advantageously, placing the M- and N-proxies 224, 226 at the endpoints minimizes the burden on the network 100 since the functions of the proxies can be better performed at the endpoints.

To establish bi-directional communication between the MH 110 and the CH 160, there are two possible conditions:

a) MH 110 setting up a transmission session and sending data to the CH 160; or b) MH 110 maintaining bi-directional communication dialogue with the CH 160 in response to a previously established transmission session.

Before data transfer can begin, a connection or transmission session between the endpoints must first be established. In the case a) and as depicted in the sequence diagram of FIG. 4, a client application (for example a client TELNET session) running on MH 110 initiates an attempt to communicate data with a server application (for example a telnet server) running on the CH 160 by trying to set up a transmission session with the CH 160. Each data packet issued at the MH 110 comprises, among other things, the application data as its payload, as well as a unique MH address (mhADDR) as the source host address, a CH address (chADDR) as the destination host, a MH port (mhPORT) as the source port, and finally a CH port (chPORT) as the destination port (Step S1). A function of the capture layer 245 is to examine the destination address and destination port of the data packet and intercept the data packet if it is deemed to be routed to the CH 160 (Step S2). The capture layer 245 signals the M-proxy 224 to configure a new transmission session (Step S3) for the flow. To achieve this, the capture layer 245 acquires a port number (mpPORT) from the M-proxy 224 and maps this port number to the corresponding transmission session. At this juncture, the M-proxy 224 establishes dialogue with the network 100 by setting up a second transmission session with the N-proxy 226 and providing the N-proxy with its public source address (mpADDR) as the source address, the N-proxy's 226 address (npADDR) as destination address, its public port number (mpPORT') as the source port and the N-proxy's port (npPORT) as destination port (Step S4). Furthermore, the M-proxy 224 also receives a secret session identification (ID) from the N-proxy 226 to uniquely identify this session. The secret session ID could be any type of identifier that is unique to the current session and does not change during the session. For example, the secret session ID may be the SIP URL of the mobile user as described in RFC 2543 entitled "SIP: Session Initiation Protocol" produced by the Internet Engineering Task Force (IETF) and incorporated herein by reference. The session identification is later used for authentication during handoff.

Once the first transmission session is established, the capture layer 245 proceeds to redirect the MH 110 data packet belonging to the current transmission session to the stored port number (mpPORT) obtained previously from the M-proxy 224 (Step S5). The M-proxy 224 receives the data packet from the MH 110 (Step S6) and sends it to the N-proxy 226 using the second transmission session. At this point, the N-proxy 226 sets up a third transmission session with the CH 160 (Step S7) using its public address (npADDR) as the source address, the address of the CH 160 (chADDR) as the destination address, its port number (npPORT') as the source port, and the port number of the CH 160 (chPORT) as the destination port (Step S8). The N-proxy subsequently proceeds to deliver the data to the CH 160 using the third transmission session with the CH 160 (Step S9).

The step of transmitting a reply data packet includes the steps of receiving a further data packet from the MH 110 to the CH 160 (as discussed previously in FIG. 4) and delivering a reply data packet from the CH 160 to MH 110. In the case b) and as shown in the sequence diagram of FIG. 5, the MH 110 continues to exchange information with the CH 160. In Step S1, the MH 110 sends a further data packet to the CH 160 using an already established first transmission session. The further data packet is intercepted by the capture layer 245 (Step S2) and delivered to the M-proxy 224 (Step S3). In response to the reception of the further data packet (Step S4), the M-proxy 224 forwards the further data packet to the N-proxy 226 using the second transmission session between the proxies (Step S5). Likewise, the N-proxy 226 transmits the further data packet to the CH 160 (Step S6). At this stage, the CH 160 manipulates the further data packet in accordance with the server application 228 and sends to the N-proxy 226 a reply data packet having the address of the CH 160 (chADDR) as source address, the address of the N-proxy 226 (npADDR) as the destination address, the port number of the CH 160 (chPORT) as the source port, and the port number of the N-proxy (npPORT') as the destination port (Step S7). The reply data packet is then sent to the M-proxy 224 (Step S8) and subsequently to the MH 110 (Step S9) via the previously established transmission sessions. Upon arrival at the MH 110, the capture layer 245 intercepts the reply data packet (Step S10). At this point, the reply data packet contains the N-proxy's 226 address (npADDR) as source address, the public source address of the M-proxy 224 (mpADDR) as its destination address, the N-proxy's 226 port number (npPORT) as its source port number, and the M-proxy's port number (mpPORT') as the destination port number. The capture layer 245 changes the addressing information of the reply data packet back to the address of the CH 160 (chADDR) as the source address, the address of the NH 110 (mhADDR) as the destination address, the port number of the CH 160 (chPORT) as the source port and the port number of the MH 110 (mhPORT) as the destination port. The capture layer 245 then proceeds to redirect and pass the reply data to the MH 110. By changing the addressing information of the reply data packet, it appears as if the reply data packet originated from the CH 160 (Step S11) rather than the M- or N-proxies 224, 226. The reply data packet is ultimately received and accepted by the MH 110 (Step 12), whereby the entire operation is seamless to both the MH 110 and CH 160.

Figure 6:
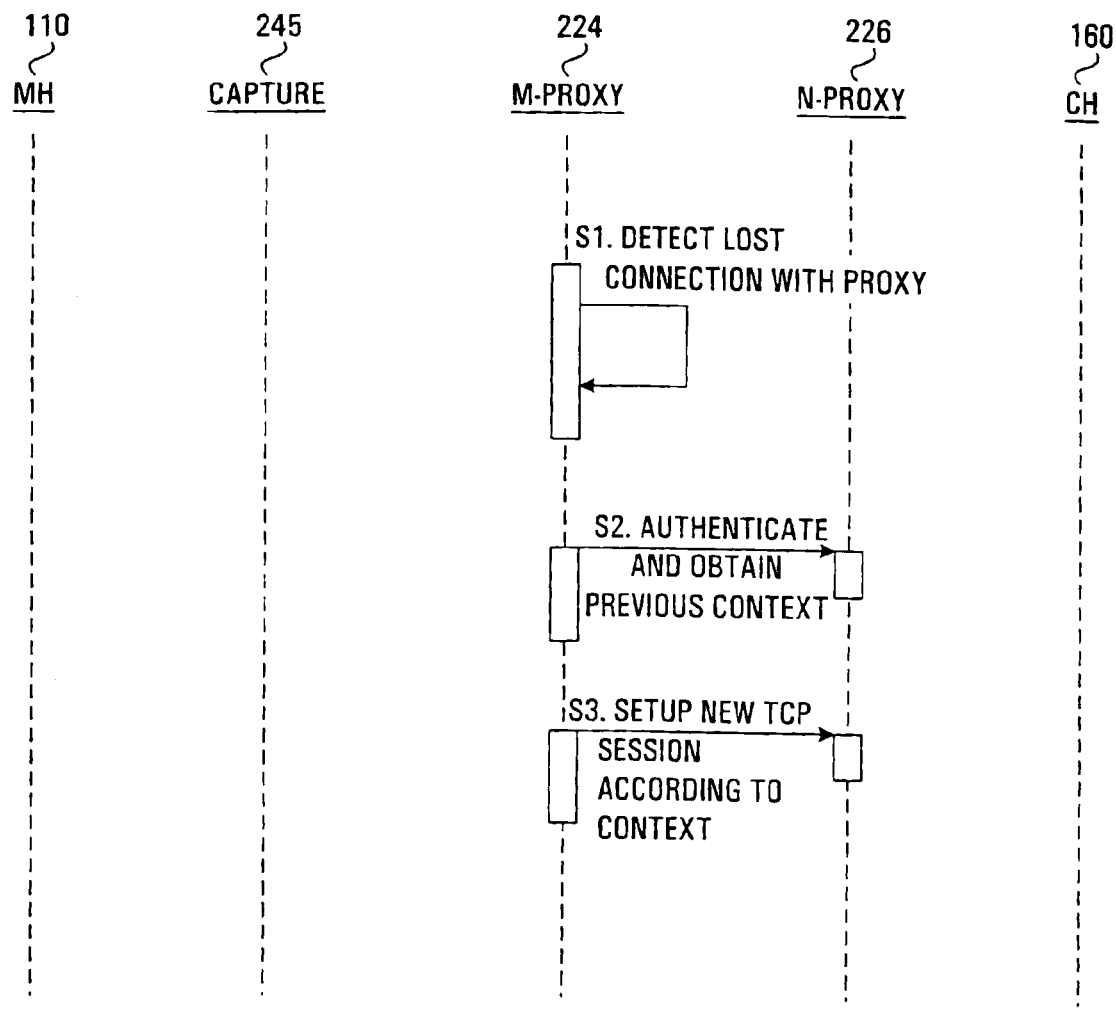
FIG. 6 is an exemplary sequence diagram illustrating a typical handoff procedure according to the method of the invention.

The sequence diagram of FIG. 6 describes the details of the handoff procedure. In order to set up a durable connection with a MH 110 in motion, the M-proxy 224 is configured to constantly monitor whether the MH 110 has moved into a new RCA 144 (Step S1). The M-proxy 224 can ascertain if the MH 110 has moved into a new location by detecting whether the access network IP address of the MH 110 (mpADDR) has changed, or whether the transmission session between itself and the N-proxy 226 is lost. Once a change of location is determined, the M-proxy 224 authenticates itself with the N-proxy 226 using the secret session ID obtained during previously established transmission sessions in Step S4 of FIG. 4 (Step S2). Since the N-proxy 226 runs on a fixed platform, its address (npADDR) remains unchanged irrespective of the MH's 110 movements. To reestablish dialogue with the N-proxy 226, the M-proxy 224 sets up a new transmission session with the N-proxy 226 based on prior context (Step S3). Accordingly, data transmission between the MH 110 and the CH 160 can continue without any loss of connectivity.

The method of the invention as described above provides mobility to the MH 110 whereby for each active transmission session between the MH 110 and the CH 160, there is a corresponding transmission session between the M- and N-proxies 224, 226. In another aspect of the invention, it is also possible to have a single transmission session between the M- and N-proxies 224, 226 to service a plurality of applications (such as a TELNET, a File Transfer Protocol (FTP), and a Simple Mail Transfer Protocol (SMTP)) concurrently running on the MH 110. In this case, the M-proxy 224 would multiplex all transmission sessions of the MH 110 applications and combine them into a single transmission session between the M- and N-proxies 224, 226. To achieve this, the M-proxy 224 adds to the MH Protocol stack 111 another application header that uniquely identifies each application running on the MH 110.

The present invention provides constant portability and ubiquitous connectivity to network subscribers by providing proxies responsible for hiding the details of the underlying handoff procedure as the mobile host migrates from one point of attachment to another. These proxies change the normal IP routing of data by delivering the data to an intermediate destination other than that specified in the IP destination address of the data packet. As a result, the mobile host is completely oblivious to the data routing during handoff as it migrates from one geographical coverage region to another. Accordingly, loss of active transmission sessions are avoided without changing the underlying principles of the TCP/IP.

Although the foregoing description is expressed based on TCP/IP, it should be noted that the method of the invention may also be implemented on other IP based communications network platforms such as the User Datagram Protocol (UDP). The invention is also applicable for communication between two fixed hosts, such as a dial-up connection. The method of the invention is therefore not intended to be limited in scope to only those networks that employ TCP/IP. What has been described is merely illustrative of the application of the principles of the invention. Other arrangements and methods can be implemented by those skilled in the art without departing from the spirit and scope of the present invention.

We claim:

1. A communications network for bi-directional transmission of a data packet between a mobile host and a corresponding host each having a unique network address, the network comprising:

an Internet backbone;

a first access network providing access to a corresponding host to the Internet backbone through a gateway;

a second access network having a gateway coupled to the Internet backbone, and a plurality of interconnected edge routers each having at least a radio access station to bi-directionally communicate data to the mobile host, each radio access station having a predetermined geographical radio coverage area associated therewith;

a mobility N-proxy in dialogue with the corresponding host through the access network, the N-proxy having means for communicating information to the corresponding host; and a mobility M-proxy having means for intercepting and terminating within itself the flow of a data packet originating from the mobile host by changing the addressing information of the data packet, such that the mobile host is thereafter communicating with the network by using a network address associated with the M-proxy, the M-proxy configured and arranged to maintain an active transmission session with the N-proxy, the M-proxy further adapted to start a new transmission session with the N-proxy in response to the mobile host changing its physical location from a first radio coverage area associated with a first edge router to a second radio coverage area associated with a second edge router, whereby the migration of the mobile host from the first radio coverage area to the second radio coverage area is substantially transparent to a network application running on the mobile host.

2. The communications network as set forth in claim 1 wherein the N-proxy acts as a peer to the M-proxy.

3. The communications network as set forth in claim 1 wherein the mobile host and the corresponding host are fixed hosts.

4. The communications network as set forth in claim 1 wherein the M-proxy is located in the mobile host itself.

5. The communications network as set forth in claim 1 wherein the communications network is based on the Transmission Control Protocol/Internet Protocol standard (TCP/IP).

6. The communications network as set forth in claim 5 wherein the hosts contain a TCP/IP protocol stack comprising an application layer, a TCP layer, and IP layer, and a link/physical layer.

7. The communications network as set forth in claim 5 wherein the means for intercepting and terminating comprises a capture layer in the M-proxy.

8. The communications network as set forth in claim 7 wherein the capture layer modifies the addressing information in TCP layer and IP layer.

9. The communications network as set forth in claim 8 wherein:

if a transmission session between the M-proxy and the capture layer has not yet been established, the capture layer configures a transmission session with the M-proxy by requesting a port number corresponding to the transmission session; else if a transmission session between the M-proxy and the capture layer has already been established, the capture layer intercepts and captures the data packet in the port number already established for the particular transmission session.

10. The communications network as set forth in claim 7 further including a storage device coupled to the communications network, such as a computer having a processor and a memory, such memory being adapted to store an application program to enable the processor to control the information exchange between the M-proxy and the N-proxy.

11. A method of data communications between a mobile host and a corresponding host in a communications network, each host having a unique network address, the method comprising the steps of:

initiating a transmission session between the mobile host and the corresponding host by sending a data packet to the corresponding host;

establishing a mobility M-proxy executing on the mobile host, the M-proxy baying a network capture layer associated therewith to intercept the data packet en route to the corresponding host;

configuring a first transmission session between the mobile host and the M-proxy;

configuring a second transmission session with a mobility N-proxy configured and arranged to communicate information to the corresponding host;

maintaining with the N-proxy the network address of the corresponding host;

capturing the data packet in flight from the mobile host to the corresponding boat using the first transmission session;

redirecting the data packet from the M-proxy to the N-proxy using the second; transmission session;

receiving the data packet at the N-proxy using the second transmission session;

configuring a third transmission session between the N-proxy and the corresponding host by interpreting the network address of the corresponding host established during the second transmission session; and delivering the data packet to the corresponding host using the third transmission session.

12. The method as set forth in claim 11 wherein the step of configuring a second transmission session with a mobility N-proxy further includes receiving a secret session ID from the N-proxy to uniquely identify the second transmission session.

13. The method as set forth in claim 12 further comprising the step of:

detecting a lost second transmission session with the N-proxy;

authenticating and obtaining the previous context; and setting up a new transmission session with the N-proxy according to the context.

14. The method as set forth in claim 11, the method further comprising the steps of:

sending a further data packet from the mobile host to the corresponding host;

intercepting the further data packet at the M-proxy via the capture layer;

redirecting the further data packet towards the M-proxy via the capture layer;

receiving the further data packet through the already established first transmission session;

forwarding the further data packet to the N-proxy using the second transmission session;

transmitting the further data packet to the corresponding host through the third transmission session; and receiving the further data packet at the corresponding host.

15. The method an set forth in claim 14, the method further comprising the steps of:

sending a repay data packet from the corresponding host to the N-proxy through the third transmission session;

forwarding the reply data packet from the N-proxy to the second transmission session;

transmitting the reply data packet from the M-proxy to the mobile host through the first transmission session;

intercepting the reply data packet at the M-proxy via the capture layer;

replacing the network address of the mobile host with the home address of the mobile host;

forwarding the reply data packet from the M-proxy to the mobile host; and receiving the reply data packet at the mobile host.

16. The method as set forth in claim 11 wherein the communications network is based on the Transmission Control Protocol/Internet Protocol standard.

17. The method ma set forth in claim 11 wherein the step of establishing a mobility M-proxy executing on the mobile host includes the step of multiplexing a plurality of transmission sessions corresponding to applications running on the mobile hosts into a single session.

18. The method as set forth in claim 17 wherein the step of delivering the data packet to the corresponding host using the third transmission session includes the step of demultiplexing the plurality of transmission sessions into individual transmission sessions corresponding to applications fanning on the mobile hot.

* * * * *

UNITED STATES PATENT AND TRADEMARK OFFICE
CERTIFICATE OF CORRECTION

| | | |
|---|---|---|
| PATENT NO. | : 6,940,835 B2 | Page 1 of 1 |
| APPLICATION NO. | : 09/749455 | |
| DATED | : September 6, 2005 | |
| INVENTOR(S) | : Ahmed Areef Reza et al. | |

It is certified that error appears in the above-identified patent and that said Letters Patent is hereby corrected as shown below:

Column 9, line 52: "...baying..." should read -- ...having... --;

Column 9, line 63: "...boat..." should read -- ...bost... --;

Column 9, line 66, Claim 11: remove semicolon after the word " second";

Column 10, line 39, Claim 15: "...repay..." should read -- ...reply... --;

Column 10, line 58, Claim 17: missing word "transmission" between "single" and "session";

Column 10, line 63, Claim 18: "...fanning..." should read -- ...running...--;

Column 10, line 64, Claim 18: "...hot..." should read --...host...--.

Signed and Sealed this

Twenty-first Day of November, 2006

JON W. DUDAS
*Director of the United States Patent and Trademark Office*